United States Patent [19]

Modaresse

[11] Patent Number: 4,868,641
[45] Date of Patent: Sep. 19, 1989

[54] DEVICE FOR DATA RATE REGULATION LINKED TO AT LEAST TWO DIGITAL VIDEO SIGNAL COMPONENTS

[75] Inventor: François Modaresse, Paris, France

[73] Assignee: U.S. Philips Corporation, New York, N.Y.

[21] Appl. No.: 289,293

[22] Filed: Dec. 21, 1988

[30] Foreign Application Priority Data

Dec. 23, 1987 [FR] France ............................... 87 18046

[51] Int. Cl.[4] ............................................. H04N 7/13
[52] U.S. Cl. ....................................... 358/13; 358/133
[58] Field of Search ............................ 358/12, 13, 133

[56] References Cited

U.S. PATENT DOCUMENTS

| | | | |
|---|---|---|---|
| 4,707,729 | 11/1987 | Bruno | 358/13 |
| 4,774,562 | 9/1988 | Chen | 358/13 |
| 4,802,003 | 1/1989 | Takei | 358/13 |

Primary Examiner—Howard W. Britton
Attorney, Agent, or Firm—Edward W. Goodman

[57] ABSTRACT

Device for data rate regulation linked to at least two digital video signal components, having a correlation reduction circuit, a scanning conversion circuit (30), a normalization circuit (40), a circuit (50) for quantification by conversion into an integral value, a circuit for encoding the quantified values, and a data rate regulation circuit, characterized in that the normalization circuit itself includes (a) a circuit (401) for the computation of the ratio rap(acti) between the activity of a first component and the activity of a second component; (b) a circuit (402) for the computation, based on rap(acti), of the ratio rap(norm) between the data rate regulation norm relating to the second component and that relating to the first component; (c) a circuit (404) for the computation of the specific norms relating respectively to the first component and to the second component, receiving, on the one hand, the said value of rap(norm) and, on the other hand, a global norm value delivered by a global norm computation circuit (406); (d) a divider (405); (e) a counter (407); (f) an auxiliary memory (408); (g) a subtractor (409); (h) the global norm computation circuit (406).

8 Claims, 3 Drawing Sheets

DEVICE FOR DATA RATE REGULATION LINKED TO AT LEAST TWO DIGITAL VIDEO SIGNAL COMPONENTS

DESCRIPTION

The present invention relates to a device for data rate regulation linked to at least two digital video signal components, comprising a correlation reduction circuit which receives the digital signals representing a certain number of points of an image divided into blocks, a scanning conversion circuit which converts the two-dimensional succession of the values of the output coefficients $F_i(u,v)$ of the correlation reduction circuit into a one-dimensional succession, a normalization circuit, a circuit for quantification by conversion into an integral value, a circuit for encoding the quantified values, and a data rate regulation circuit which receives the encoded values in accordance with a variable data rate and, on the one hand, sends an average norm value associated with the data rate to the normalization circuit, and, on the other hand, delivers values at a constant data rate to the output of the regulation device a delay circuit possibly being provided, for example, between the correlation reduction circuit and the scanning conversion circuit. This invention is applicable, in particular, in the field of the transmission of television signals, as well as in that of the recording and/or of the storage of such signals.

the digitization of the television signals, with a view to their transmission or to their recording, is an extremely useful solution in the case of links where the interfering noise is particularly great, especially links by satellite. However, a television image contains a very large quantity of information items, the digital representation of which involves a high data rate. Sampling the components of the television signal at a frequency satisfying the Shannon condition and operating a uniform quantification in 256 levels, the direct digitization of the luminance and chrominance components at the frequencies of 13.5 and of 6.75 megahertz respectively, required by the standards, would, in fact, lead to a data rate of 216 Mbit/s. This data rate is entirely prohibitive, especially in the case of magnetic recording devices intended for the general public. The use of data rate reduction techniques is therefore necessary, and all the more feasible where a relatively high redundancy exists in the image.

U.S. Pat. No. 4,394,774 describes a data rate regulation device which operates by encoding the video signals following an orthogonal transformation. This image is dissected into blocks of a specified size, and then the orthogonal transformation is applied to each block. The coefficients emanating from this transformation are then divided by a normalization factor, and then quantified and encoded. However, such a device does not take account of the difference in statistical properties of the video signals locally, in order to adapt certain parameters of the encoding to these local properties.

SUMMARY OF THE INVENTION

The object of the invention is to provide a device for the regulation of the data rate of digital video signals which remedies such a disadvantage.

To this end, the subject of the invention is a device characterized in that the normalization circuit itself comprises:

(a) a circuit for the computation of the ratio rap(acti) between the activity of a first component and the activity of a second component, the activity being a quantity which, proceeding from the coefficients obtained in the one-dimensional succession for each component, reflects the greater or lesser significance of the high spatial frequencies in the spectral content of each one of the image blocks, and this quantity being computed for each component by connection of the input of the circuit for the computation of rap(acti) to the output of the scanning conversion circuit;

(b) a circuit for the computation, proceeding from rap(acti), of the ratio rap(norm) between the data rate regulation norm relating to the second component and that relating to the first component;

(c) a circuit for the computation of the specific norms relating, respectively, to the first component and to the second component, receiving, on the other hand, the value of rap(norm) and, on the other hand, a global norm value delivered by a circuit for the computation of a global norm;

(d) a divider for dividing the output of the scanning conversion circuit by the output of the global norm computation;

(e) a counter for counting the number of binary elements present in the data rate regulations circuit for the current block in the course of processing;

(f) an auxiliary memory for the temporary storage of the number of binary elements; and (g) a subtractor determining by its sign the difference of the number of binary elements between the input and the output of the auxiliary memory;

(h) the global norm computation circuit, receiving, on the one hand, the output of the subtractor and, on the other hand, the output of the counter and delivering a global norm value intended for one of the inputs of the circuit for the computation of specific norms.

BRIEF DESCRIPTION OF THE DRAWING

The particular features of the invention will appear in a more detailed manner in the description which follows and in the accompanying drawings, which are given by way of non-limiting examples, and in which.

DESCRIPTION OF THE PREFERRED EMBODIMENT

Figure 1:
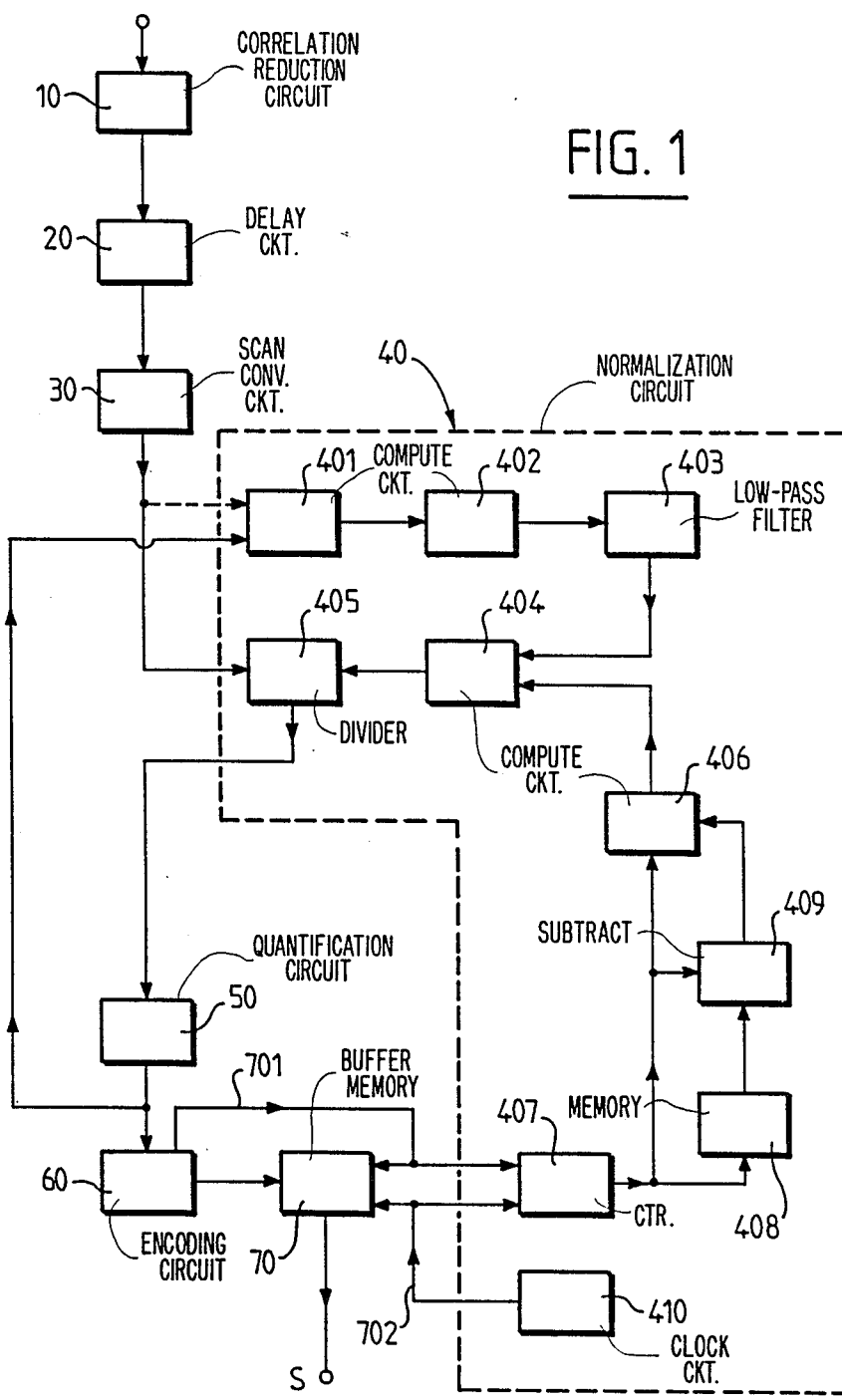
FIG. 1 shows an embodiment of the data rate regulation device according to the invention.

In the embodiment represented in FIG. 1, the device according to the invention comprises, first of all, a correlation reduction circuit 10, which is, for example, a circuit for transformation into discrete cosine. This circuit 10 receives a succession of digital signals representing, in the form of a matrix of values, the chrominance of a certain number of points or elements of an image divided into blocks, and delivers for each block a two-dimensional succession of coefficients $F_i(u,v)$. FIG.

2a shows such an image, divided into M×N blocks. The transformation into discrete cosine is a known operation, and the expression of these transformation coefficients obtained successively for each block will therefore not be given here. It will simply be recalled that numerous statistical measurements have permitted the demonstration of the very strong correlation between adjacent points of a frame or of an image, and that the object of the transformation is to obtain a set of coefficients which are more independent than the values available before transformation.

Figure 2A:
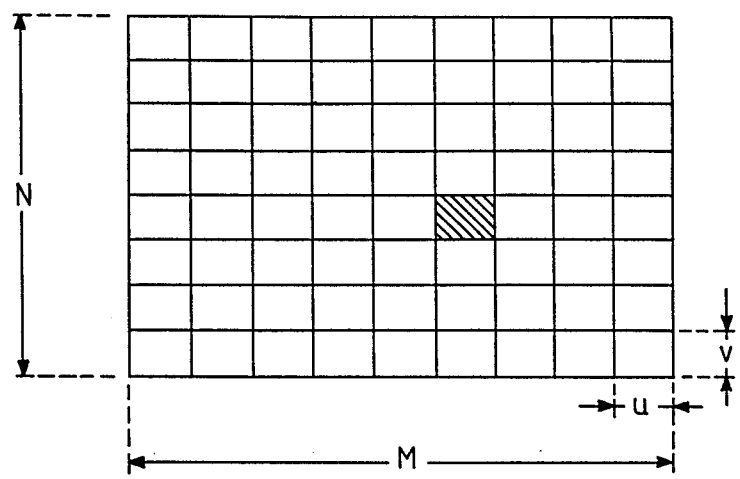
FIG. 2a shows an image divided into M×N blocks.
Figure 2B:
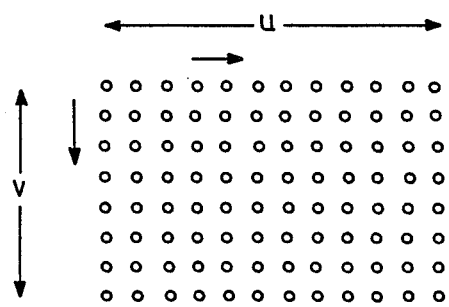
FIG. 2b represents the two-dimensional matrix of the transformation coefficients of one of these blocks of images.
Figure 2C:
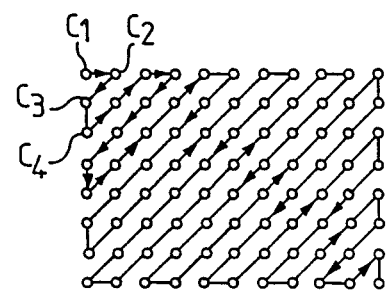
FIG. 2c shows an example of a type of one-dimensional route for the reading and the processing of the coefficients.

The coefficients $F_i(u,v)$ are then supplied, in this instance via a delay circuit 20, to a scanning conversion circuit 30 for converting the two-dimensional succession of values $F_i(u,v)$ into a one-dimensional succession. The delay circuit 20 serves to store one or more blocks of one of the components when the two components are not available simultaneously. For a block such as that of FIG. 2b, itself corresponding to that indicated by hatchings on FIG. 2a, the one-dimensional dimensional succession may be, for example, a zigzag succession like that indicated in FIG. 2c, which shows, in a representation of the two-dimensional matrix of the transformation coefficients of the image block, an example of a type of route defining—in a non-limiting manner, of course—an order of reading and of processing of the coefficients ($C_1$, $C_2$, C]hd 3, . . . etc. . . .). This type of route exhibits the following advantage, namely that it permits the subsequent tackling of the operation of encoding of the video signals while presenting long ranges of null values; this contributes to reducing the quantity of information items to be transmitted. This one-dimensional succession might, however, be constituted on the basis of a different criterion, without nevertheless departing from the scope of the invention, or even being determined in an adaptive manner as a function of characteristics measured on the signal itself, or alternatively be constituted by successive reading in different spatially adjacent blocks.

A normalization circuit 40, which is described in greater detail further on, then receives this one-dimensional succession. The output of the circuit 40, which is normalized, is then quantified in the quantification circuit 50, and then encoded in the encoding circuit 60. The output of this encoding circuit 60 is connected to the input of a buffer memory 70 which receives the encoded values in accordance with a variable data rate and restores them at its principal output S with a constant data rate. This principal output constitutes the output of the data rate regulation device according to the invention.

The quantification operation permits the conversion of the normalized value of each coefficient, expressed with a floating point, into an integral value, for example either by simple rounding or preferably by truncation, by taking the integral part of the value before quantification, and these operations, moreover, being capable of possibly being combined with a compression or an expansion of the scale of the values. Subjected to such a quantification, a certain number of values within the range between 0 and 1 are replaced by the value 0; this diminishes the number of significant coefficients to be transmitted to the encoding circuit and therefore proceeds in the direction of the data rate reduction sought. The encoding operation is, in this instance, performed with the aid of encoded value tables in accordance with a Huffman code, for the encoding either of values of coefficients (variable-length encoding) or of lengths of ranges (encoding by ranges).

The normalization circuit 40 will now be described in greater detail. In order to adapt the data rate to the local properties of the image, it was necessary to seek a function linking the activity of a block to the number of binary elements necessary to ensure sure the encoding of this block (the activity reflects the nature of the spectral content of the block and, more specifically, the greater or lesser significance, in this content, of the high spatial frequencies, and is therefore, for example, low for a quasi-uniform block, or, on the other hand, the higher, the greater is the extent to which the block contains contours and these contours are rigid).

The tests which were carried out led to the selection, as expression of this activity, of the expression (1), which is given in the Appendix to the present description, this being an expression in which $C_i$ is, within the block considered, the i-th coefficient of the one-dimensinal succession delivered by the scanning conversion circuit 30 (the expression (1) as well as the expressions possibly referred to in the continuation of the present description are all set forth in the Appendix). The first coefficient, $C_1$, is not used, since it corresponds to the average amplitude of the block and does not provide any information concerning the spectral content of the block. Its value is independent of the data rate, since it is encoded in a particular manner, with a constant number of bits, for example eight or nine bits, in order to avoid erroneous interpretations which would lead to changes of colors or of grey levels.

In the text which follows, consideration will be given, first of all, to the example of a regulation linked to the two chrominance components U and V, and then the application of the same principle to the luminance and to the chrominance, that is to say, in fact, to the three components of a video signal.

Having defined an expression for the activity, two expressions (2) and (3) are thus available which, in the first example where the digital video signal processed is a chrominance component, define the activity for each one of the two components U and V (the signals representing color difference, likewise called $D_R$ and $D_B$ in accordance with the SECAM and MAC standards), and the correlation is then sought between, on the one hand, these activites acti($D_R$) and acti($D_B$) and, on the other hand, the quantity of information items present at the output of the buffer memory 70. For this, the matter of interest will be not the values themselves of these activities, but their ratio rap(acti) given by the expression (4). In fact, having regard to the total data rate permitted at the output, it is of special interest to know that proportion of this total data rate is allocated to each component.

It is, moreover, known that it is the quantity referred to as the norm which is used for the regulation of the data rate, and that the product of the norm and of the data rate, applied to a specified coefficient, for example to the 32nd coefficient which corresponds substantially to the center of the spectrum, is constant; this is expressed by the relations (5) and (6), in which $K_R$ and $K_B$ are constants. In this case again, the matter of interest will be not the norm itself, but the ratio of the norms, rap(norm), given by the expression (7). As the determination of the norms is equivalent to that of the data rates, an investigation will thus finally be made as to which is the function f expression the relation (8) between rap(norm) and rap(acti), or more specifically the relation (9) between rap(norm) and the respective activities acti($D_R$) and acti($D_B$) of the components $D_R$ and $D_B$.

It is known that the acuity of the human eye is markedly greater in the red than in the blue. This permits the tolerance of more encoding faults for the component $D_B$ than for the component $D_R$ in the matter of data rate. The tests undertaken in the regulation trials finally led, for comparable levels of activity between the two components $D_R$ and $D_B$, to the fixing of the ratio of the norms at the value of approximately 2.5, as is expressed by the relation (10) for a value of rap(acti) approximately equal to 1.

An example of a satisfactory function f is then, especially, the straight line which passes, on the one hand, through the point (1, f(1)) defined hereinabove for rap(acti) equal to 1 and, on the other hand, through the point (0, f(0)) corresponding to a null activity for $D_R$. In fact, in the case of null activity, a certain proportion of data rate must nevertheles be reserved with a view to the systematic encoding of the continuous coefficient (the first coefficient not used, as indicated above) and of the indication of the end of a block (in this case, of the two end-of-block words).

The regulation of data rate is carried out after the encoding of a certain number of blocks corresponding to the component $D_R$ and of a certain number of blocks corresponding to the component $D_B$, in the present case after the encoding of a single block $D_R$ and of a single block $D_B$, without this choice being limiting. A global norm is computed as a function of the level of filling of the buffer memory 70 and of the variation of this level. By then taking account of the constancy of the product of the global norm and of the data rate, expressed by the relation (11), and of the expressions (5) and (6) for the norms relating to each component $D_R$ and $D_B$, the final expression for these norms takes the form defined by the relations (12) and (13).

The computation permitting the determination of the formulae (12) and (13) may be detailed as follows. Knowing that the global norm is determined in such a manner as to satisfy the relation (11), it is sought to obtain two specific norms, respectively norm ($D_R$) and norm ($D_B$), satisfying the equations (5) and (6) but, furthermore, the relation (14). As the global data rate is the sum of the data rates relating to $D_R$ and to $D_B$, and being aware of the equations (5), (6), (11) and (14), the euations (15), (16) and (17) emerge. Substituting these terms in the equation (18) clearly leads to the equation (19); this gives, simplifying by K and then carrying out the addition and taking the inverse of the two terms of the equation, the expression (20). By factoring norm ($D_R$) and then simplifying by this same term, and finally by multiplying the two sides of the equation by (1 + rap(norm)), the expression (12) is obtained. By replacing norm($D_B$) by its value in one of the equations (for example, in (20)), the expression (13) is obtained. These last expressions clearly give rise to the expressions (21) and (22), which are, in fact, the relations of greatest interest.

This general presentation of the functions constructed by the device according to the invention being made, it is now, in effect, possible to specify the content of the normalization circuit 40. This circuit 40 comprises, first of all, a circuit 401 for computation of rap(acti) from the activites acti)$D_R$) and acti($D_8$) of each one of the two components $D_R$ and $D_B$, this circuit 401 being provided at the output of the scanning conversion circuit 30. At the output of the circuit 401, a circuit 402 for the computation of rap(norm) then computes this last quantity with the aid of the expression (8) and on the basis of the hypothesis adopted (in a non-limiting manner) with regard to the choice of the function f. In this case, this circuit 402 is followed by a low-pass recursive filter circuit 403. The value of rap(norm) thus smoothed is supplied to a circuit 404 for the computation of the specific norms, that is to say of norm ($D_R$) and of norm ($D_B$) in accordance with the expressions (12) and (13) respectively. Finally, a divider 405 attends to the division of the output of the scanning conversion circuit 30 by norm($D_R$) or by norm($D_B$) depending upon the nature of the component in the course of encoding (block $D_R$ or block $D_B$, as has been specified hereinabove).

The computation of the specific norms, norm($D_R$) and norm ($D_B$), which is undertaken by the circuit 404, implies that this circuit should receive, in accordance with the expressions (12) and (13), not only the value of rap(norm) but also that of the global norm. This global norm is supplied by a circuit 406 for the computation of the global norm in accordance with the following process.

A counter 407 provided at the output of the buffer memory 70 gives the exact member of binary elements present in this memory for the current block in the course of processing, and an auxiliary memory 408 temporarily stores this number of binary elements which, in the course of the processing of the following block, which has become the current block, will, of course, represent the number of binary elements of the block which has become the preceding block. A subtractor 409 then determines, by its sign, the difference between the input and the output of the said auxiliary memory 408, that is to say the difference of the number of binary elements between two successive blocks, and supplies this difference to the circuit for the computation of global norm 406. This circuit 406 likewise receives, on another input connection, the number of binary elements of the current block, which is supplied by the counter 407, and delivers at the output, for passing to the circuit for the computation of the specific norms 404, the value modified, upwards or downwards, of the global norm.

For the writing and the reading of the buffer memory 70, the latter comprises respectively a first input connection 701 connected to the output of the encoding circuit 60 and controlling both the writing to memory and the incrementing of the counter 407, and a second input connection 702, itself connected to a clock circuit 410 defining a fixed rhythm (in this instance, for example, 1 Mbit/second but satisfactory trials have been carried out likewise using higher or lower rhythms) to ensure a constant data rate. This clock circuit 410 thus controls the emptying of the buffer memory 70, as well as the decrementing of the counter 407.

The present invention is, of course, not limited to the embodiment described and represented hereinabove, proceeding from which variants, including those which have already been set forth, may be proposed without nevertheless departing from the scope of the invention.

It has already been mentined, in particular, that the invention could not be limited by the type of route adopted for the reading of the two-dimensional matrix of the transformation coefficients of each image block. Irrespective of this route and the more or less marked specific advantage or advantages which result therefrom, the normalization may be effected in accordance with the principles set forth in detail previously. The type of route adopted has an influence essentially on the encoding, and the quantity of information items which emerges from the encoding circuit and thus the data rate and the global norm are clearly dependent upon the nature of the encoding, but without this modifying the mode of implementation of the invention or diminishing the benefit thereof.

It has likewise been seen that the respective activities of the blocks $D_R$ and of the blocks $D_B$ were determined, by the circuit 401, on the basis of the information items available at the output of the scanning conversion circuit 30, that is to say on the basis of the coefficients before normalisation and quantification. Now, a large part of the energy attached to a block is lost following these operations of normalization and of quantification. This means that the same computation carried out on reception will not give an identical value for the activity of each block, and this may result in inexact determinations of the norm and the appearance of false colours on decoding.

This disadvantage, which is limited by the fact that use is in fact made not of the activites but of their ratio rap(acti), may nevertheless be reduced by operating no long on the basis of the output information items of the circuit 30, but onthe basis of the coefficients after normalization and quantification. It is, in fact, this preferential arrangement which has been adopted and which is represented in solid lines in Figure 1, the solution involving the taking of the data at the output of the scanning converter 30 being represented only in broken lines. By proceeding in this way, it is true that preference is given, in the course of the evaluation of rap-(acti), to the low-frequency terms, but in general it is precisely the activity in this range of the low spatial frequencies which is predominantly of interest, since the latter must be encoded with greater care.

However, it is necessary to note that the activity defined in this manner no longer possesses as good a correlation with the data rate, and this nevertheless constituted the initial criterion for the definition of a satisfactory expression for the activity. This thus results in a poorer ratio between the variations of the data rate and the respective values of the norms, and a risk of a certain drift for the level of filling of the buffer memory 70. This disadvantage may be remedied, as indicated in FIG. 1, by the establishment, between the output of the circuit 402 for the computation of rap(norm) and the corresponding input of the circuit 404 for the computation of the specific norms, of the circuit 403 for low-pass recursive filtering of the norm. The inertia thus imparted to the device permits the parameters of the operations to be confined within a relatively small range about their average value, and thus permits this drift to be limited.

A linked regulation of the data rate of the components $D_R$ and $D_B$ of the chrominance has been described previously. The same principle and the same manner of implementation are usable if it is desired to operate a data rate regulation linked to the chrominance and to the luminance. It is, in fact, sufficient to replace the component $D_R$, in the description set forth hereinabove, by the luminance Y and the component $D_B$ by the chrominance C and, in the relation (10), to adapt the value of rap(norm) for rap(acti)=1 to this new application, by adopting, for example, f(1)=4, the ratio which is currently most widely adopted between the respective data rates of the luminance and of the chrominance (the two chrominance components are themselves regulated jointly, as has been described previously). The diagram of the linked regulation device is, consequently, strictly identical to that of FIG. 1.

In one or the other of the applications ($D_R/D_b$ regulation, luminance/chrominance regulation) which have just been described, the invention is not limited to the device for carrying out, or emission, such a regulation, but extends to the system of transmission of television images which includes at least one such device. Transmission, of course, is invariably understood in this instance as referring to the transmission per se of the signals, but also their recording or their storage. The invention likewise extends to any emission stage which, in such a transmission system, comprises the structure described with reference to FIG. 1, as well as to any corresponding reception stage.

Figure 3:
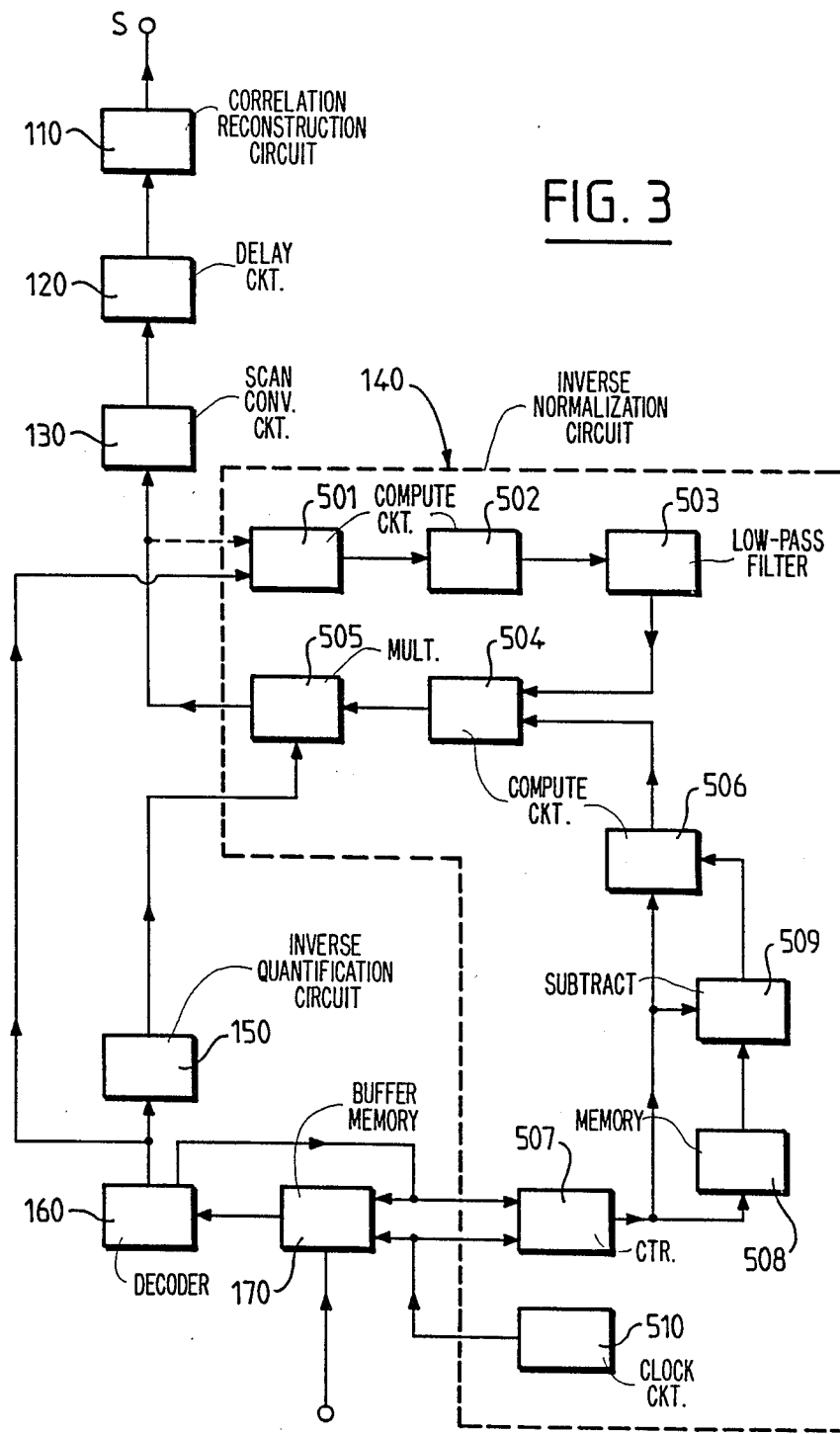
FIG. 3 shows an example of a decoding device for use in a reception stage.

It will be noted that such a reception stage comprises a device for the reconstruction of signals which is the precise inverse of the regulation device described previously. More specifically, and as indicated in FIG. 3, this device comprises a buffer memory 170 receiving input signals at constant data rate and delivering them at variable data rate, a circuit 160 for decoding these information items at variable data rate, a circuit 150 for the inverse quantification of the decoded signals, an inverse normalization circuit 140, a scanning conversion circuit 130, possibly a delay circuit 120, and a correlation reconstruction circuit 110. The inverse normalization circuit 140 is quasi-identical to the normalization circuit 40, with replacement of the references 401 to 410 by the references 501 to 510. Only the divider 405 of the latter circuit is replaced, in the circuit 140, by a multiplier 505 of the output of the inverse quantification circuit 150 by the output of the circuit 504 for the computation of the specific norms. Of course, as previously in FIG. 1, the input signals of the circuit 501 for the computation of rap(acti) may be taken either at the input of the scanning conversion circuit 130 (connection in broken lines in FIG. 3), or at the input of the inverse quantification circuit 150 (on this same FIG. 3, connection in solid line), the latter solution being preferably adopted.

APPENDIX (1) $\sum_{i \geq 2} |C_i|$ (2) $acti(D_R) = (\Sigma C_i)$
$i \geq 2$ DR (3) $acti(D_B) = (\Sigma C_i)$
$i \geq 2$ DB (4) $rap(acti) = \dfrac{acti(D_R)}{acti(D_B)} = h(acti(D_R), acti(D_B))$ (5) $norm(D_R)_{32} \times data\ rate(D_R) = K_R$ (6) $norm(D_B)_{32} \times data\ rate(D_B) = K_B$ (7) $rap(norm) = \dfrac{norm(D_B)}{norm(D_R)} = g(norm(D_R), norm(D_B))$ (8) $rap(norm) = f(rap(acti))$ (9) $rap(norm) = f[h(acti(D_R), acti(D_B))] = g(norm(D_R), norm(D_B))$

(10) $(rap(norm))_{for\ rap(acti)=1} = f(1) = 2.5$

(11) global norm × global data rate = K = constant

APPENDIX-continued

(12) $$\text{norm}(D_R) = \frac{1 + \text{rap(norm)}}{\text{rap(norm)}} \times \text{global norm}$$

(13) $\text{norm}(D_B) = (1 + \text{rap(norm)}) \times \text{global norm}$

(14) $K_R = K_B = K$

(15) $$\frac{K}{\text{global norm}} = \text{global data rate}$$

(16) $$\frac{K}{\text{norm}(D_R)} = \text{data rate}(D_R)$$

(17) $$\frac{K}{\text{norm}(D_B)} = \text{data rate}(D_B)$$

(18) $\text{global data rate} = \text{data rate}(D_R) + \text{data rate}(D_B)$

(19) $$\frac{K}{\text{global norm}} = \frac{K}{\text{norm}(D_R)} + \frac{K}{\text{norm}(D_B)}$$

(20) $$\text{global norm} = \frac{\text{norm}(D_R) \times \text{norm}(D_B)}{\text{norm}(D_R) + \text{norm}(D_B)}$$

(21) $\text{norm}(D_B) = \text{global norm} \times (1 + f(\text{rap(acti)}))$

(22) $$\text{norm}(D_R) = \text{global norm} \times \left( \frac{1 + f(\text{rap(acti)})}{f(\text{rap(acti)})} \right)$$

I claim:

1. Device for data rate regulation of at least two digital video signal components, comprising a correlation reduction circuit which receives the digital signal components representing a certain number of points of an image divided into blocks, a scanning conversion circuit which converts two-dimensional succession of values of output coefficients $F_i(u,v)$ of the correlation reduction circuit into a one-dimensional succession, a normalization circuit, a circuit for quantification by conversion into an integral value, a circuit for encoding the quantified values, and a data rate regulation circuit which receives the encoded values in accordance with a variable data rate and sends an average norm value associated with the said data rate to the normalization circuit, and delivers values at a constant data rate to the output of the regulation device, characterized in that said normalization circuit comprises:

(a) a circuit for computing a ratio rap(acti) between an activity of a first component and an activity of a second component, the activity being a quantity which, proceeding from the coefficients obtained in the one-dimensional succession for each component, reflects the greater or lesser significance of high spatial frequencies in the spectral content of each one of said image blocks, and this quantity being computed for each component by connection of the input of said circuit for computing rap-(acti) to the output of the scanning conversion circuit;

(b) a circuit for computing a ratio rap(norm) between a data rate regulating norm relating to the second component and that relating to the first component;

(c) a circuit for computing specific norms relating, respectively, to the first component and to the second component, receiving said value of rap(-norm) and a global norm value delivered by a circuit for computing a global norm;

(d) a divider for dividing an output of the scanning conversion circuit by an output of said global norm computing circuit;

(e) a counter for counting a number of binary elements present in the data rate regulation circuit for the current block in the course of processing;

(f) an auxiliary memory for temporary storage of said number of binary elements;

(g) a subtractor for determining, by its sign, a difference of the number of binary elements between the input and the output of said auxiliary memory;

(h) the global norm computing circuit, receiving an output of said subtractor and an output of the couner and delivering a global norm value intended for one of the inputs of the circuit for computing said specific norms.

2. Device for data rate regulation of at least two digital video signal components, comprising a correlation reduction circuit which receives said digital signal components representing a certain number of points of an image divided into blocks, a scanning conversion circuit which converts a two-dimensional succession of values of output coefficients $F_i(u,v)$ of the correlation reduction circuit into a one-dimensional succession, a normalization circuit, a circuit for quantification by conversion into an integral value, a circuit for encoding the quantified values, and a data rate regulation circuit which receives the encoded values in accordance with a variable data rate and sedns an average norm value associated with said data rate to the normalization circuit, and delivers values at a constant data rate to the output of the regulation device, characterized in that said normalization circuit comprises:

(a) a circuit for computing a ratio rap(acti) between an activity of a first component and an activity of a second component, the activity being a quantity which, proceeding from the coefficients obtained in the one dimensional succession for each component, reflects the greater or lesser significance of high spatial frequencies in the spectral content of each one of said image blocks, and this quantity being computed for each component by connection of the input of said circuit for computing rap-(acti) to the output of the qualification circuit;

(b) a circuit for computing a ratio rap(norm) between a data rate regulating norm relating to the second component and that relating to the first component;

(c) a circuit for computing specific norms relating, respectively, to the first component and to the second component, receiving said value of rap(-norm) and a global norm value delivered by a circuit for computing a global norm;

(d) a divider for dividing an output of the scanning conversion circuit by an output of said global norm computing circuit;

(e) a counter for counting a number of binary elements present in the data rate regulation circuit for the current block in the course of processing;

(f) an auxiliary memory for temporary storage of said number of binary elements;

(g) a subtractor for determining, by its sign, a difference of the number of binary elements between the input and the output of said auxiliary memory;

(h) the global norm computing circuit, receiving an output of said subtractor and an output of the counter and delivering a global norm value intended for one of the inputs of the circuit for computing said specific norms.

3. Device according to one of claims 1 and 2, characterized in that the first and second components are signals representing color difference, referred to as $D_R$ and $D_B$, which constitute a chrominance component C of a television signal.

4. Device according to one of claims 1 and 2, characterized in that the first and second components are components referred to as luminance Y and chrominance C components of a television signal.

5. Device according to claim 3, characterized in that said device comprises, between an output of the circuit for computing rap(norm) and a corresponding input of the circuit for computing the specific norms, a circuit for low-pass recursive filtering the norm.

6. A system for the transmission of television images via a channel involving a processing of reduction of the quantity of information items to be transmitted, this system comprising at least one emission stage and one reception stage, characterized in that said emission stage comprises a data rate regulation device according to claim 3.

7. A reception stage for a transmission system according to claim 6, comprising a buffer memory which receives input signals at constant data rate and delivers signals at a variable data rate, a circuit for decoding these signals, a circuit for inverse quantification of the decoded signals, an inverse normalization circuit, a scanning conversion circuit, and a correlation restoration circuit, characterized in that said inverse normalization circuit itself comprises:

(a) a circuit for computing a ratio rap(acti) between an activity of the first component and an activity of the second component, these activity values being computed for each component for constituting an input of said circuit for computing rap(acti) either to an output of the scanning conversion circuit or, depending upon the particular case, to an output of the quantification circuit;

(b) a circuit for computing a ratio rap(norm) component between the data rate regulation norm relating to the second component and that relating to the first component;

(c) a circuit for computing specific norms relating, respectively, to the first component and to the second component, receiving said value of rap(norm) and a global norm value delivered by a circuit for computing a global norm;

(d) a multiplier for multiplying an output of the quantification circuit by an output of said global norm computing circuit;

(e) a counter for counting a number of binary elements present in the date rate regulation circuit for the current block in the course of processing;

(f) an auxiliary memory for temporary storage of said number of binary elements;

(g) a subtractor for determining, by its sign, a difference of the number of binary elements between the input and the output of said auxiliary memory;

(h) the global norm computation circuit, receiving an output of said subtractor and an output of the counter and delivering a global norm value intended for one of the inputs of the circuit for computing the specific norms.

8. Device accordng to claim 7, characterized in that said device comprises, between an output of the circuit for computing rap(norm) and a corresponding input of the circuit for computing the specific norms, a circuit for low-pass recursive filtering the norm.

* * * * *